US010255883B2

(12) United States Patent
Nagashima

(10) Patent No.: US 10,255,883 B2
(45) Date of Patent: Apr. 9, 2019

(54) IMAGE PROCESSING APPARATUS, METHOD FOR CONTROLLING THE SAME, DISPLAY APPARATUS, AND STORAGE MEDIUM

(71) Applicant: CANON KABUSHIKI KAISHA, Tokyo (JP)

(72) Inventor: Yoshiyuki Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,917

(22) Filed: Jul. 25, 2017

(65) Prior Publication Data
US 2018/0033400 A1   Feb. 1, 2018

(30) Foreign Application Priority Data

Jul. 28, 2016   (JP) .................................. 2016-148940

(51) Int. Cl.
| G09G 5/10 | (2006.01) |
| G06T 11/00 | (2006.01) |
| G06T 5/00 | (2006.01) |
| H04N 1/60 | (2006.01) |
| H04N 5/57 | (2006.01) |
| H04N 9/73 | (2006.01) |

(Continued)

(52) U.S. Cl.
CPC .............. *G09G 5/10* (2013.01); *G06T 5/007* (2013.01); *G09G 3/36* (2013.01); *G09G 2320/0276* (2013.01); *G09G 2320/0693* (2013.01); *G09G 2320/08* (2013.01); *G09G 2340/0428* (2013.01); *G09G 2360/145* (2013.01); *G09G 2360/16* (2013.01)

(58) Field of Classification Search
USPC ......................................................... 345/589
See application file for complete search history.

(56) References Cited

U.S. PATENT DOCUMENTS

| 2012/0169792 A1* | 7/2012 | Yamashita ............ G02F 1/1336 345/690 |
| 2013/0169663 A1* | 7/2013 | Seong ....................... G09G 5/00 345/589 |

(Continued)

FOREIGN PATENT DOCUMENTS

JP   2004220438 A   8/2004

*Primary Examiner* — Wesner Sajous
(74) *Attorney, Agent, or Firm* — Canon U.S.A., Inc. IP Division

(57) ABSTRACT

An image processing apparatus for outputting to a display unit an output image, includes a conversion unit configured to convert a gradation value of a first pixel, of an input image, the first pixel corresponding to luminance higher than a maximum value of luminance at which the display unit can display into a predetermined gradation value, to convert a gradation value of a second pixel of the input image, the second pixel corresponding to luminance less than or equal to the maximum value of the luminance at which the display unit can display, into a gradation value less than or equal to the predetermined gradation value, and to generate the output image that includes both the first pixel with converted gradation value and the second pixel with converted gradation value; and an output unit configured to output the output image to the display unit.

22 Claims, 12 Drawing Sheets

(51) Int. Cl.
*H04N 9/64* (2006.01)
*G09G 3/36* (2006.01)

(56) References Cited

U.S. PATENT DOCUMENTS

| | | | |
|---|---|---|---|
| 2014/0307007 A1* | 10/2014 | Cho | G09G 3/3406 345/690 |
| 2015/0242701 A1* | 8/2015 | Tokui | H04N 5/243 382/190 |
| 2016/0006939 A1* | 1/2016 | Suzuki | H04N 5/2355 348/239 |
| 2017/0330504 A1* | 11/2017 | Haraguchi | G09G 3/2803 |

* cited by examiner

FIG. 4

| REFLECTANCE OF INPUT IMAGE [%] | DISPLAY LUMINANCE [cd/m²] |
|---|---|
| 0 | 0 |
| 100 | 100 |
| 200 | 200 |
| 300 | 300 |
| ⋮ | ⋮ |
| 800 | 800 |
| 900 | 900 |
| 1000 | 1000 |

IMAGE PROCESSING APPARATUS, METHOD FOR CONTROLLING THE SAME, DISPLAY APPARATUS, AND STORAGE MEDIUM

BACKGROUND OF THE INVENTION

Field of the Invention

The present invention relates to an image processing apparatus, a method for controlling the same, a display apparatus, and a storage medium.

Description of the Related Art

In recent years, with improvement in the light-receiving performance of an image capturing apparatus, an image is generated such that the limit of luminance range (the dynamic range) of the image is wider than that of BT.709, which is used as general video gamma. Such a wide dynamic range is referred to as a "high dynamic range (HDR)", and an image compatible with an HDR is referred to as an "HDR image".

Meanwhile, in a case where an HDR image is viewed on a display apparatus, then according to the preference of a user, some HDR images of input HDR images are displayed with a range (a display range) being set to be displayed faithfully to specified luminance. In such a case, image processing (a compression process) for narrowing the dynamic range of the HDR image to the display range may be performed on the HDR image, and a display image is generated.

In Japanese Patent Application Laid-Open No. 2004-220438, a display image is generated so that the display image is displayed with the luminance of a pixel being maintained less than or equal to predetermined luminance, while a pixel having luminance greater than the predetermined luminance is saturated at the upper limit value of a display range.

SUMMARY OF THE INVENTION

According to an aspect of the present invention, an image processing apparatus for outputting to a display unit an output image includes a conversion unit configured to convert a gradation value of a first pixel of an input image, the first pixel corresponding to luminance higher than a maximum value of luminance at which the display unit can display, into a predetermined gradation value, to convert a gradation value of a second pixel of the input image, the second pixel corresponding to luminance less than or equal to the maximum value of the luminance at which the display unit can display, into a gradation value less than or equal to the predetermined gradation value, and to generate the output image that includes both the first pixel with converted gradation value and the second pixel with converted gradation value, and an output unit configured to output the output image to the display unit.

According to another aspect of the present invention, a method of controlling an image processing apparatus to cause an image processing apparatus to perform processing, includes converting a gradation value of a first pixel of an input image, the first pixel corresponding to luminance higher than a maximum value of luminance at which a display unit can display, into a predetermined gradation value, converting a gradation value of a second pixel of the input image, the second pixel corresponding to luminance less than or equal to the maximum value of the luminance at which the display unit can display into a gradation value less than or equal to the predetermined gradation value, and generating the output image that includes both the first pixel with converted gradation value and the second pixel with converted gradation value, and outputting the output image to the display unit.

According to yet another aspect of the present invention, a non-transitory storage medium has stored therein a program that can be executed by a processor to cause an image processing apparatus connected with the processor, to execute processing including converting a gradation value of a first pixel of an input image, the first pixel corresponding to luminance higher than a maximum value of luminance at which the display unit can display, into a predetermined gradation value, converting a gradation value of a second pixel of the input image, the second pixel corresponding to luminance less than or equal to the maximum value of the luminance at which the display unit can display, into a gradation value less than or equal to the predetermined gradation value, and generating an output image that includes both the first pixel with converted gradation value and the second pixel with converted gradation value, and outputting the output image to the display unit.

Further features of the present invention will become apparent from the following description of example embodiments with reference to the attached drawings.

BRIEF DESCRIPTION OF THE DRAWINGS

FIG. 4 is a table illustrating information indicating a correspondence relationship between a luminance-related value indicated for the input image and the display luminance.

DESCRIPTION OF THE EMBODIMENTS

A description will be provided of an image processing apparatus according to a first example embodiment of the present invention and a method for controlling the image processing apparatus. The present invention may also be applied, for example, to a display apparatus including the image processing apparatus and a display for displaying an image generated by the image processing apparatus. For example, the present invention can be applied to a liquid crystal display apparatus, an organic electroluminescent (EL) display apparatus, and a plasma display apparatus. In the present example embodiment, an example is described where image data (input image data) to be input to the image processing apparatus is image data stored in a storage medium included in the image processing apparatus. Alternatively, the input image data may be captured image data obtained through imaging with an image capturing apparatus.

Figure 1:
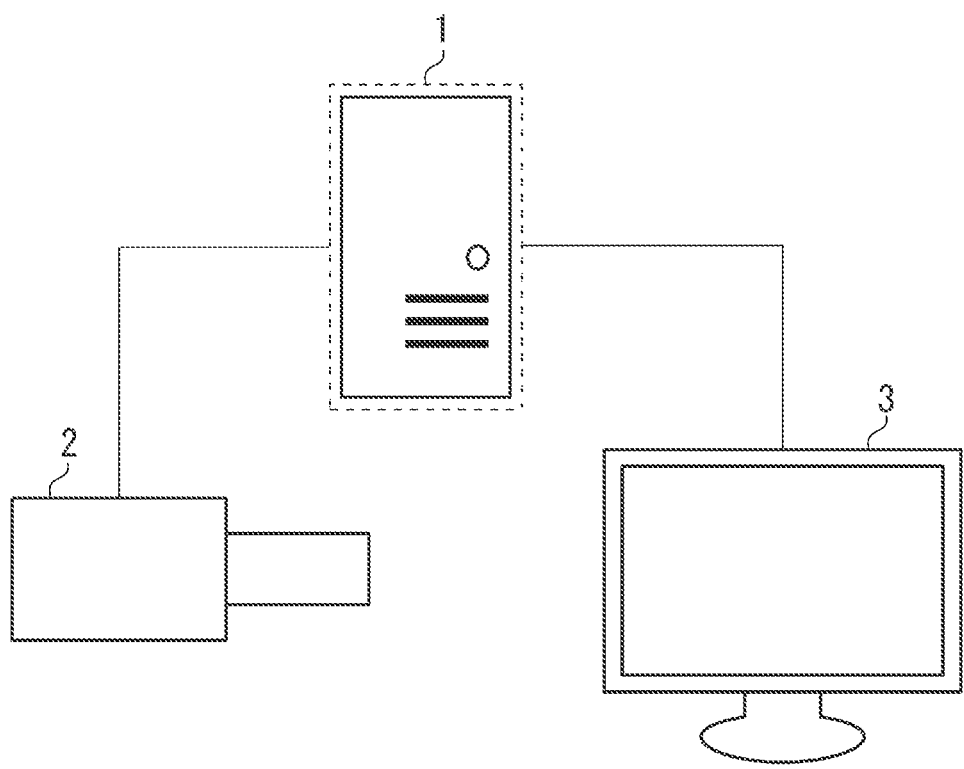
FIG. 1 is an apparatus configuration diagram illustrating an image processing apparatus according to a first example embodiment, a measurement apparatus, and a display unit.

FIG. 1 is an apparatus configuration diagram illustrating an image processing apparatus 1 according to the first example embodiment, a measurement apparatus 2, and a display unit 3. As illustrated in FIG. 1, the image processing apparatus 1 can connect to the measurement apparatus 2 and the display unit 3. For example, the image processing apparatus 1 is a personal computer (PC). The image processing apparatus 1 controls the operation of the measurement apparatus 2 and also acquires a luminance measurement value measured by the measurement apparatus 2. Furthermore, the image processing apparatus 1 determines the dynamic range of an output image to be output to the display unit 3 based on the luminance measurement value, converts the dynamic range of an input image, generates the output image, and outputs the generated output image to the display unit 3.

The measurement apparatus 2 is a measuring device including a photosensor for measuring the luminance of light emitted from the display unit 3.

The display unit 3 is a display for displaying an image based on image data output from the image processing apparatus 1. The display unit 3 displays an image based on acquired image data on a screen including a plurality of pixels arranged in a matrix. For example, the display unit 3 is a liquid crystal display apparatus including a liquid crystal panel and a backlight. The image processing apparatus 1 and the display unit 3 may be included in a display apparatus.

Figure 2:
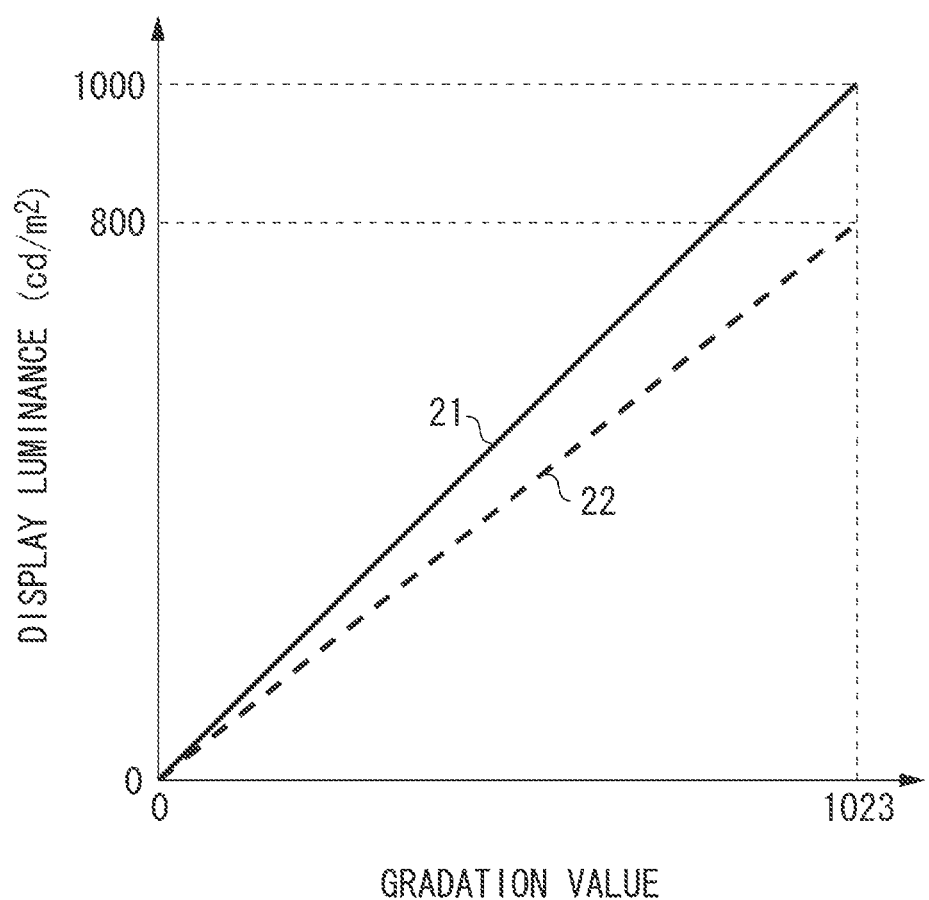
FIG. 2 is a schematic diagram illustrating a relationship between a gradation value of an image to be input to the display unit, and display luminance of the display unit.

FIG. 2 is a schematic diagram illustrating the relationship between the gradation value of an image to be input to the display unit 3 and the display luminance of the display unit 3. FIG. 2 illustrates the display characteristics of the display unit 3. The display unit 3 has display characteristics in which the display luminance linearly corresponds to the gradation value. The maximum display luminance at which the display unit 3 can perform display corresponds to the maximum value of a value that can be taken by the gradation value of an image to be input to the display unit 3.

A straight line 21 in FIG. 2 indicates the display characteristics before the maximum value of the display luminance of the display unit 3 decreases (before the luminance decreases). The display unit 3 can perform display up to a display luminance of 1000 $cd/m^2$ before the luminance decreases. A dashed line 22 in FIG. 2 indicates the display characteristics in a case where the maximum value of the display luminance of the display unit 3 decreases (when the luminance decreases). The maximum value of the display luminance of the display unit 3 decreases to 800 $cd/m^2$ when the luminance decreases. "$cd/m^2$" is a unit indicating the absolute value of luminance. Since the display unit 3 has the display characteristics in which the display luminance linearly corresponds to the gradation value, the display luminance relative to the gradation value is lower in the display characteristics of the display unit 3 when the luminance decreases than in the display characteristics of the display unit 3 before the luminance decreases. The display characteristics of the display unit 3 are stored in a storage unit 200 of the image processing apparatus 1.

In a case where the display unit 3 displays an image based on a calibration image output from the image processing apparatus 1, the measurement apparatus 2 measures the luminance of light emitted from the display unit 3. The measurement apparatus 2 outputs the measured luminance to the image processing apparatus 1.

The calibration image is an image used by the measurement apparatus 2 to measure the maximum luminance at which the display unit 3 can perform display. The calibration image is an image displaying the maximum gradation value at which the display unit 3 can perform display, in a predetermined size or larger at the position where the measurement apparatus 2 measures the luminance. For example, suppose that the display unit 3 includes sub-pixels corresponding to red (R), green (G), and blue (B) colors and can display an image based on image data in which a gradation value is represented using 10-bit data for each sub-pixel. In this case, the calibration image is an image specifying a gradation value of 1023 for the sub-pixel of each pixel. That is, the calibration image is an image in which an all-white image is displayed at the position on the screen of the display unit 3 where the measurement apparatus 2 measures the luminance.

That is, the measurement apparatus 2 measures the luminance of the display unit 3 on which an image is displayed based on the calibration image, measuring display maximum luminance indicating the maximum display luminance at which the display unit 3 can perform display.

When executing a calibration process (calibration), the image processing apparatus 1 reads a calibration image from the storage unit 200 and outputs the calibration image to the display unit 3. For example, the image processing apparatus 1 outputs to the display unit 3 a calibration image generated in advance so that an all-white image is displayed at the position (a measurement position) on the screen of the display unit 3 that the photosensor of the measurement apparatus 2 faces. The calibration image may be generated based on the measurement position set when the calibration process is executed.

Figure 3:
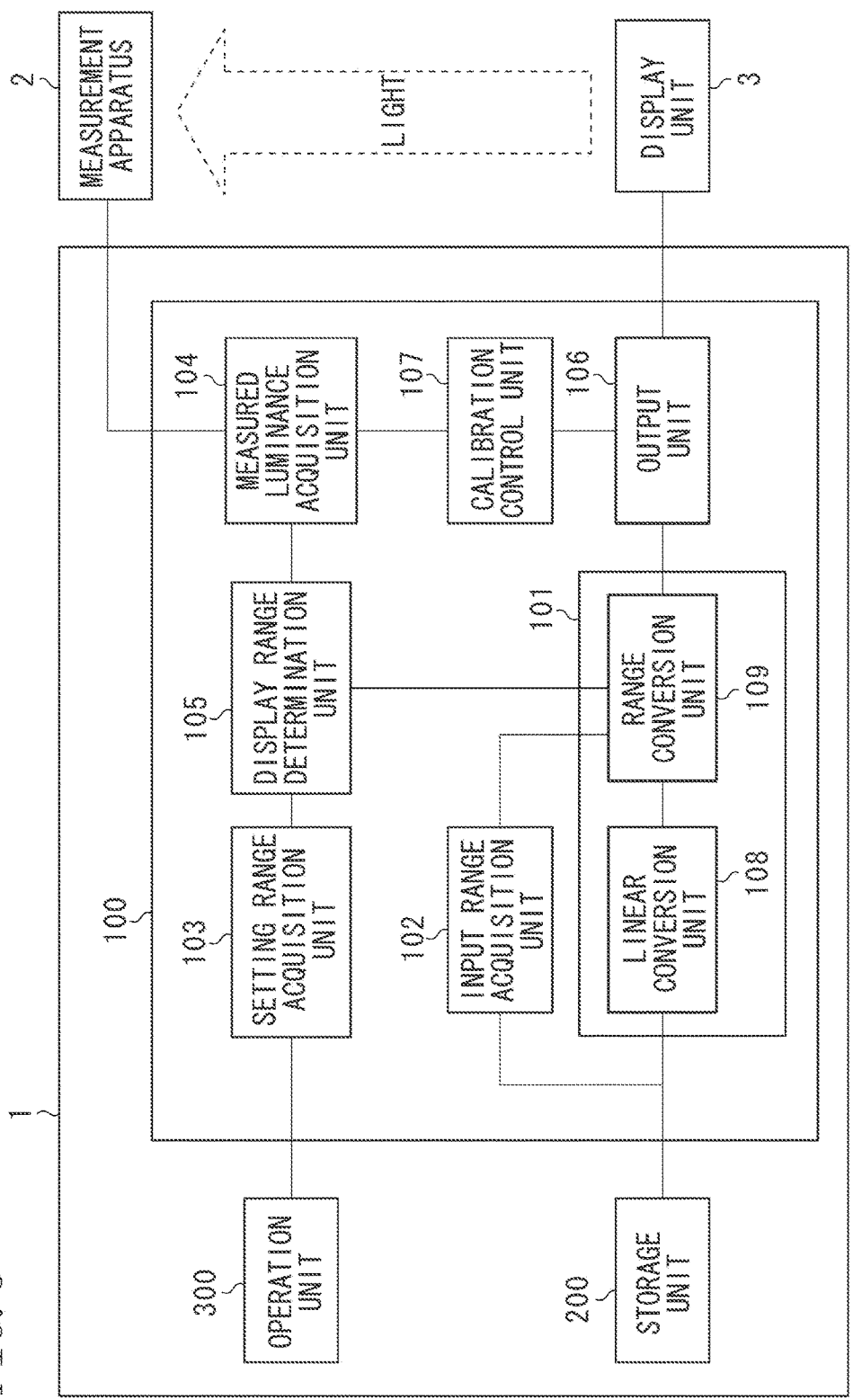
FIG. 3 is a block diagram illustrating an example of a configuration of the image processing apparatus.

FIG. 3 is a block diagram illustrating an example of the configuration of the image processing apparatus 1 according to the first example embodiment. As illustrated in FIG. 3, the image processing apparatus 1 includes a control unit 100, a storage unit 200, and an operation unit 300.

The control unit 100 is a control circuit board for converting the dynamic range of an input image acquired from the storage unit 200 into a display range determined based on a luminance measurement value acquired from the measurement apparatus 2, generating an output image, and outputting the generated output image to the display unit 3. The control unit 100 includes a computation processing unit, such as a central processing unit (CPU) or a micro processing unit (MPU), for executing the processing of all or some of the functional blocks described below. The control unit 100 may include hardware, such as an electronic circuit for executing the processing of some of the functional blocks described below. The computation processing unit of the control unit 100 executes a program read from the storage unit 200 to execute the processing described below.

The storage unit 200 is a storage medium readable by the computation processing unit and for storing image data from which the output image is generated by the control unit 100, the program to be executed by the computation processing unit of the control unit 100, and parameters for use in executing the program. For example, the storage unit 200 is a non-volatile storage medium, such as a hard disk. The storage unit 200 may include a volatile storage medium, such as a semiconductor memory. The storage unit 200 stores detected luminance acquired from the measurement apparatus 2.

The operation unit 300 is an operation member for a user to input an instruction to the image processing apparatus 1. For example, the operation unit 300 is an input device, such as a keyboard and a mouse, for physically inputting a signal. The operation unit 300 may be configured such that the user inputs an instruction by operating a graphical user interface (GUI) displayed on the display unit 3. For example, the operation unit 300 allows the input of an instruction to execute calibration and the input of a display range setting value to the image processing apparatus 1.

The control unit 100 includes an image processing unit 101, an input range acquisition unit 102, a setting range acquisition unit 103, a measured luminance acquisition unit 104, a display range determination unit 105, an output unit 106, and a calibration control unit 107. The image processing unit 101 includes a linear conversion unit 108 and a range conversion unit 109.

The image processing unit 101 converts the gradation value of the input image so that a dynamic range targeted by the output image becomes a display range acquired from the display range determination unit 105, and generates the output image. In other words, the image processing unit 101 performs a gradation conversion process on the input image so that in the dynamic range of the input image, a range included in the display range has gradation, generating the output image. The image processing unit 101 outputs the output image to the output unit 106. The specific processing of the image processing unit 101 will be described below.

The input range acquisition unit 102 acquires the dynamic range of the input image (an input range). Specifically, the input range is the range of a luminance-related value targeted by the input image. The input range can also be said to be the range of a luminance-related value that can be taken by the input image. The input range acquisition unit 102 outputs information indicating the acquired input range to the image processing unit 101.

For example, the input range is information added to data of the input image. In this case, the input range acquisition unit 102 executes the process of separating the information indicating the input range to acquire the input range from the input image. In a case where the input image is a captured image input from an image capturing apparatus connected to the image processing apparatus 1, the input range acquisition unit 102 can acquire the information indicating the input range from the image capturing apparatus.

The luminance-related value is a value related to luminance. In the present example embodiment, the luminance-related value is reflectance. The reflectance is a form of representation of luminance and indicates, when light is reflected from an object, the ratio between the luminance of a light source and the luminance of the reflected light. The luminance of an object illuminated with ambient light is often represented by a reflectance of approximately 0 to 100%, and the luminance of a light source (an illumination device or the sun) having luminance exceeding thereof is often represented by a reflectance of 100% or more. In the present example embodiment, the reflectance targeted by the input image data is 0 to 1000%, and the signal level (the gradation value) of the input image data has a 10-bit value (0 to 1023). That is, the input image data can be said to be image data in which a gradation value corresponding to a luminance-related value included in the input range is specified.

The luminance-related value only needs to be a value related to luminance, and is not limited to reflectance. For example, the luminance-related value may be luminance (a luminance value) itself, or may be the amount of light incident on an image sensor included in the image capturing apparatus. The range of the reflectance targeted by the input image data and the range of the gradation value of the input image data may be narrower or wider than the above ranges.

The setting range acquisition unit 103 acquires information indicating a setting range input by the user through the operation unit 300. The setting range is, in the input range, a dynamic range where, in displaying an image based on the input image on the display unit 3, the image is displayed faithfully to luminance corresponding to the luminance-related value indicated for the input image. For example, the user inputs 0 to 1000% as the setting range. The setting range acquisition unit 103 outputs the acquired information indicating the setting range to the image processing unit 101.

The setting range acquisition unit 103 can also acquire the setting range according to an operation mode set by the user. For example, in a case where a display mode corresponding to BT.709 is set, the setting range acquisition unit 103 acquires a dynamic range of 0 to 100% as the setting range. In a case where a display mode corresponding to image data having a wider dynamic range than that of BT.709 is set, the setting range acquisition unit 103 acquires a wider setting range than the range of 0 to 100% according to the display mode. A wide dynamic range (e.g., a wider dynamic range than that of BT.709) can be said to be a "high dynamic range (HDR)". Image data having a wide dynamic range can be said to be "HDR image data".

According to the execution of the calibration process, the measured luminance acquisition unit 104 acquires, from the measurement apparatus 2, display maximum luminance indicating the maximum value of the luminance at which the display unit 3 can perform display. For example, the display maximum luminance is 800 cd/m$^2$ (the maximum value of the display luminance of the display unit 3 when the luminance decreases). The measured luminance acquisition unit 104 may control the measurement apparatus 2 so as to measure luminance based on a signal acquired from the calibration control unit 107.

On the basis of the information indicating the setting range acquired from the setting range acquisition unit 103 and the display maximum luminance acquired from the measured luminance acquisition unit 104, the display range determination unit 105 determines the dynamic range of the output image (a display range) to be generated by the image processing unit 101. More specifically, the display range determination unit 105 sets as the display range the narrower dynamic range of the setting range and a reference range.

FIG. 4 is a table illustrating luminance-related information indicating the correspondence relationship between the luminance-related value and the display luminance. In FIG. 4, the luminance-related value is reflectance. The luminance-related information indicating the correspondence relationship between the luminance-related value and the display luminance is stored, for example, as table data in the storage unit 200. In the present example embodiment, the relationship between the reflectance of the input image and the display luminance is linear. For example, a reflectance of 100% of the input image corresponds to a display luminance of 100 cd/m$^2$.

Using the display maximum luminance and the luminance-related information, the display range determination unit 105 acquires a reference range corresponding to the display maximum luminance. From FIG. 4, the reference range corresponding to the display maximum luminance (800 cd/m$^2$) acquired from the measured luminance acquisition unit 104 is 0 to 800%. Thus, in this case, the display range determination unit 105 determines the reference range (800%) as the display range. The display range determination unit 105 outputs information indicating the display range to the image processing unit 101.

The output unit 106 outputs to the display unit 3 the output image output from the image processing unit 101. The output unit 106 may convert the output image into a data format usable by the display unit 3 and output the resulting output image. Furthermore, as will be described below, the output unit 106 outputs to the display unit 3 a calibration image read from the storage unit 200 according to an instruction from the calibration control unit 107 when the calibration process is executed.

The calibration control unit 107 controls the measured luminance acquisition unit 104 and the output unit 106 so as to execute the calibration process. The calibration control unit 107 executes the calibration process based on an instruction from the user. The calibration control unit 107 may execute the calibration process based on timing predetermined in advance and stored in the storage unit 200.

In a case where the calibration process is executed, the calibration control unit 107 outputs to the output unit 106 a signal instructing the output unit 106 to output a calibration image to the display unit 3. The calibration control unit 107 outputs to the measured luminance acquisition unit 104 a signal instructing the measured luminance acquisition unit 104 to acquire the display maximum luminance from the measurement apparatus 2.

The image processing unit 101 includes the linear conversion unit 108 and the range conversion unit 109. On the basis of the information indicating the input range output from the input range acquisition unit 102 and the information indicating the display range output from the display range determination unit 105, the image processing unit 101 performs a range conversion process on the input image, and generates the output image. The image processing unit 101 generates the output image so that in the output image, an area, in the input image, corresponding to a luminance-related value included in the display range is closer to the gradation characteristics of the input image than an area, in the input image, corresponding to a luminance-related value not included in the display range.

The range conversion process is the process of converting the dynamic range of the input image from the input range to the display range. More specifically, in the range conversion process, each gradation value of the input image is converted so that the dynamic range of the output image becomes the display range. By the range conversion process, in the input range, a range inside the display range obtains characteristics closer to the gradation characteristics of the input image as the gradation characteristics of the output image than a range outside the display range. The image processing unit 101 outputs the generated output image to the display unit 3.

Image processing to be performed on the input image by the image processing unit 101 is not limited to the range conversion process. Alternatively, a plurality of types of image processing including the range conversion process may be performed on the input image. As image processing other than the range conversion process, for example, a pixelization process and an edge enhancement process may be used. The image processing unit 101 can also perform a linear conversion process on the input image as described below.

Figure 5:
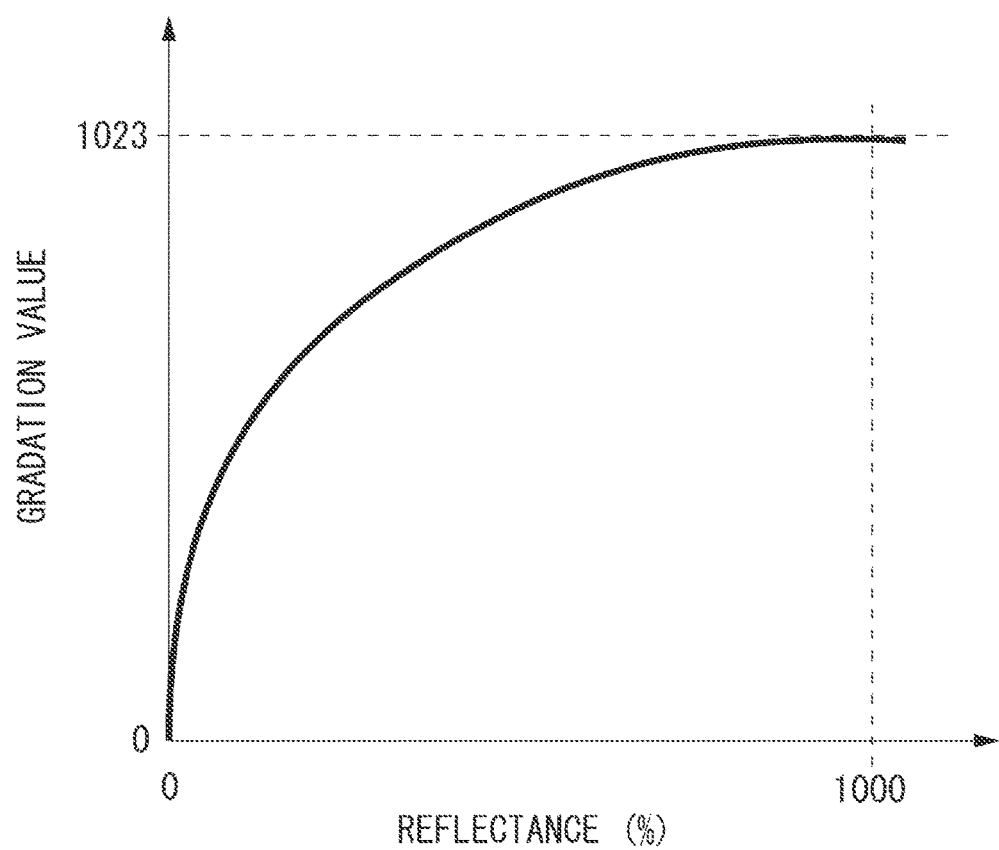
FIG. 5 is a schematic diagram illustrating a relationship between reflectance and a gradation value of the input image.
Figure 6:
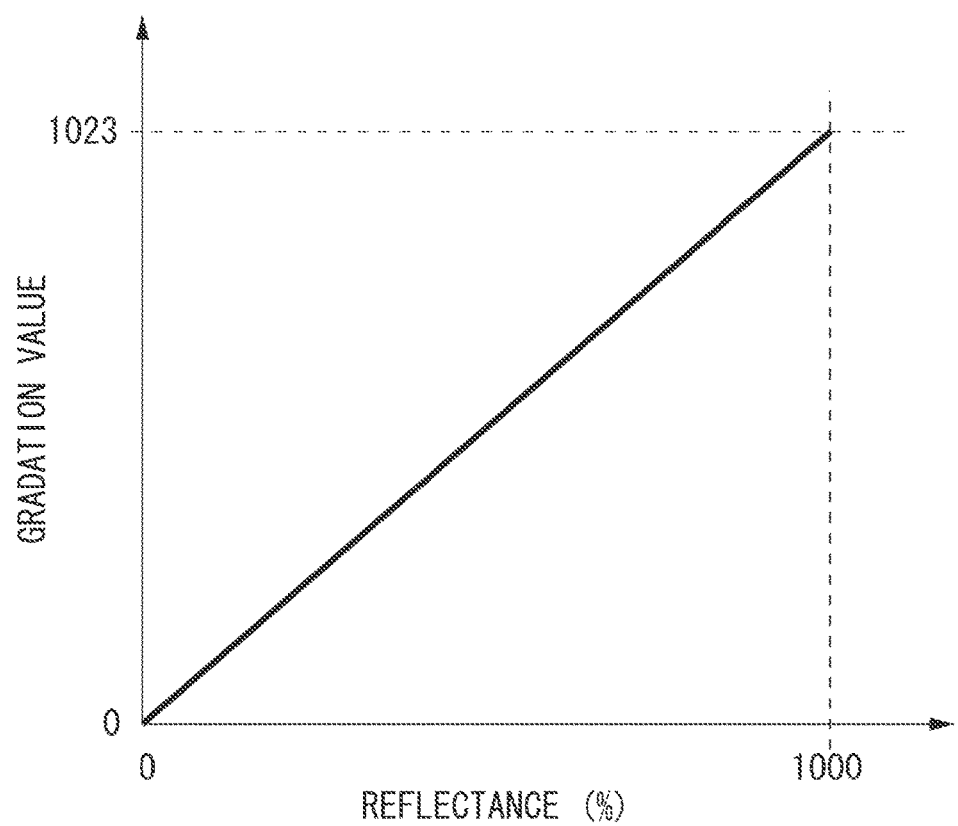
FIG. 6 is a schematic diagram illustrating a relationship between the reflectance and a gradation value of a linear image.

The linear conversion unit 108 performs a linear conversion process on the input image in which the relationship (the gradation characteristics) between the luminance-related value (the reflectance) and the gradation value is non-linear, and generates a linear image having linear gradation characteristics. FIG. 5 is a schematic diagram illustrating the relationship between the reflectance and the gradation value of the input image. In the present example embodiment, the input image has non-linear characteristics in which the gradation value non-linearly (logarithmically) increases relative to an increase in the reflectance. For example, the gradation characteristics of the input image are the power of 1/γ relative to the reflectance. FIG. 6 is a schematic diagram illustrating the relationship between the reflectance and the gradation value of the linear image. As illustrated in FIG. 6, the linear image has linear gradation characteristics in which the gradation value linearly increases relative to an increase in the reflectance. The linear conversion unit 108 converts the gradation characteristics of the input image into the gradation characteristics of the linear image.

The linear conversion unit 108 outputs the generated linear image to the range conversion unit 109. The linear conversion process is performed to simplify the subsequent processing, and may be omitted.

The range conversion unit 109 performs the range conversion process on the linear image to generate an output image in which the range of the luminance-related value is the display range. The range conversion unit 109 may perform a gamma conversion process taking into account the gamma characteristics of the display unit 3 on the linear image subjected to the range conversion process. For example, in a case where the gamma characteristics of the display unit 3 have a gamma value of 2.2, the range conversion unit 109 performs a gamma conversion process for raising the gradation value of the linear image subjected to the range conversion process to the power of 1/2.2. The gamma conversion process may be omitted. In the present example embodiment, the gamma characteristics of the display unit 3 have a gamma value of 1, and the gamma conversion process is omitted.

Figure 7:
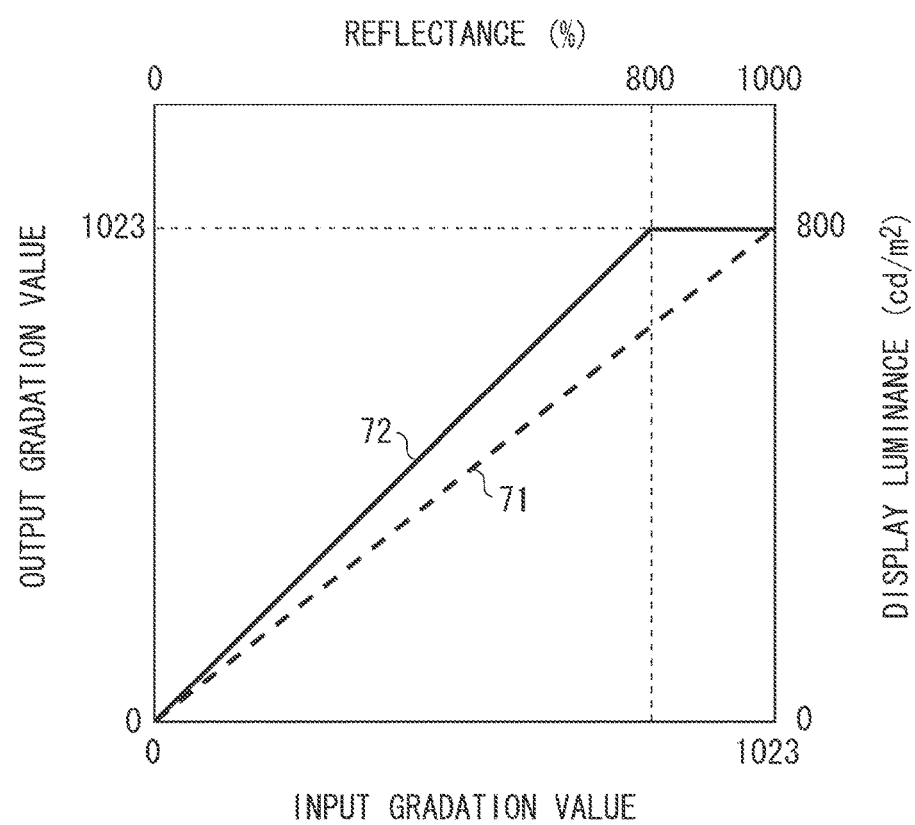
FIG. 7 is a schematic diagram illustrating examples of correspondence relationships between an input gradation value and the reflectance of the input image, and an output gradation value and the display luminance.

With reference to FIG. 7, an example of the range conversion process according to the present example embodiment is specifically described. FIG. 7 is a schematic diagram illustrating an example of the correspondence relationships between the gradation value of the linear image (an input gradation value) and the reflectance of the input image, and the gradation value of the output image (an output gradation value) and the display luminance in a case where an image is displayed based on the output image. A horizontal axis in FIG. 7 indicates the input gradation value. Since the gradation value of the linear image linearly corresponds to the reflectance of the input image as a result of the linear conversion process, the horizontal axis in FIG.

7 indicates the reflectance of the input image. A vertical axis in FIG. 7 indicates the output gradation value. In the first example embodiment, as illustrated in FIG. 2, the display characteristics of the display unit 3 are linear relative to the gradation value. Thus, the vertical axis in FIG. 7 indicates the display luminance of the display unit 3.

In the present example embodiment, the gradation value of the output image is also a 10-bit value (0 to 1023) as with the case of the input image. The range of the gradation value of the output image may be narrower or wider than the above range. The range of the gradation value of the output image may be narrower or wider than the range of the gradation value of the input image.

A dashed line 71 in FIG. 7 indicates, for comparison, the relationship between the input gradation value and the output gradation value in a case where the range conversion process is not performed. In a case where the range conversion process is not performed, the output gradation value has the same gradation value as the input gradation value.

A solid line 72 in FIG. 7 indicates the relationship between the input gradation value and the output gradation value in a case where the range conversion process according to the present example embodiment is performed. In the present example embodiment, an output gradation value Lout is calculated using the following formula 1.

$$Lout = (D1 \div D2) \times Lin \quad \text{(formula 1)}$$

In formula 1, D1 is the maximum reflectance of the input range. D1 is 1000%. D2 is the maximum reflectance of the display range. D2 is 800%. Lin is the input gradation value. In formula 1, in a case where calculated Lout is greater than the maximum value of a gradation value that can be used as the output gradation value, Lout is set to 1023. That is, the output gradation value Lout greater than 1023 is clipped (limited) to 1023. Such a conversion process is termed a clipping process.

Through the above range conversion process, an output image is generated in which a range, in the input range of the input image, included in the display range has gradation.

Each gradation value of the linear image may or may not be changed by calculation using formula 1. For example, a lookup table (LUT) representing the correspondence relationship between the input gradation value and the output gradation value may be generated in advance based on formula 1. Then, each gradation value of the linear image may be changed using the LUT. Specifically, an output gradation value corresponding to the gradation value of the linear image (the input gradation value) may be acquired from the LUT, and each gradation value of the linear image may be changed to the acquired value (the acquired output gradation value).

The above range conversion process is executed, and at a luminance-related value (reflectance), in the input range, corresponding to the display range, the output image is displayed at luminance faithful to the correspondence between the luminance-related value of the input image and the luminance, as indicated by the solid line 72. By contrast, in a case where the range conversion process is not performed, the display luminance of display on the display unit 3 is overall lower than luminance corresponding to the luminance-related value of the input image, as indicated by the dashed line 71. This reduces the visibility of an image displayed on the display unit 3.

Through the above range conversion process, in the range of the reflectance of the input image, the display range obtains characteristics closer to the gradation characteristics of the input image as the gradation characteristics of the output image than a range outside the display range. Consequently, it is possible to suppress a change in the gradation characteristics and the degradation of image quality and also obtain a display image having high visibility.

The calculation formula for the output gradation value Lout is not limited to formula 1. Formula 1 is appropriately changed depending on the gradation characteristics of the image before the range conversion process, the gradation characteristics of the image after the range conversion process, the range of the input gradation value, or the range of the output gradation value.

According to the present example embodiment, in a case where the display luminance at which the display unit 3 can perform display decreases due to, for example, the degradation over time of the light source of the display unit 3 or light-emitting elements, it is possible to suppress a change in the display luminance of the input image. Using a change in the display luminance of the output image before and after the luminance of the display unit 3 decreases, effects of the image processing apparatus 1 according to the present example embodiment are described. For example, the display unit 3 can perform display up to 1000 cd/m$^2$ before the luminance decreases. Assume that the display unit 3 can perform display up to 800 cd/m$^2$ when the luminance decreases. Further assume that the setting range is 0 to 1000%.

Figure 8:
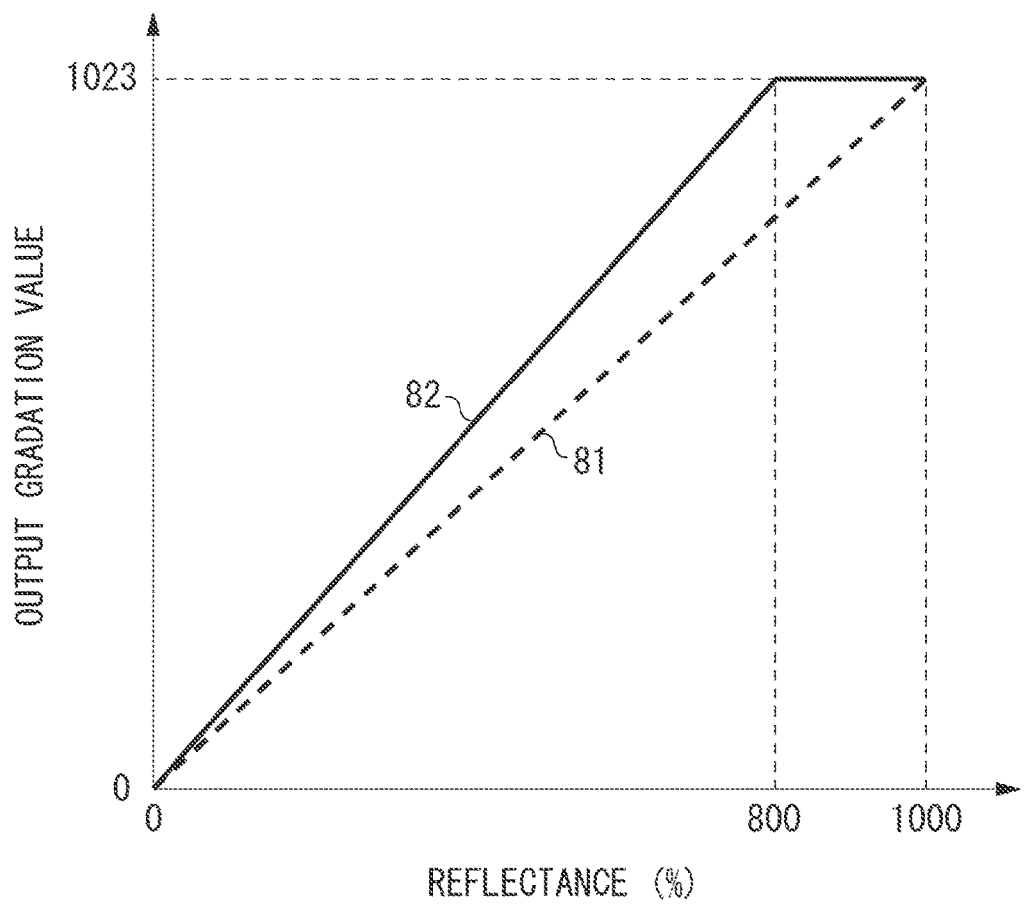
FIG. 8 is a schematic diagram illustrating a gradation value of an output image relative to the reflectance of the input image.

FIG. 8 is a schematic diagram illustrating the gradation value of the output image relative to the reflectance of the input image. A horizontal axis in FIG. 8 indicates the reflectance of the input image. A vertical axis in FIG. 8 indicates the gradation value of the output image. A dashed line 81 in FIG. 8 indicates the gradation value of an output image A relative to the reflectance of the input image in a case where the display range is 0 to 1000%. The dashed line 81 can be said to indicate the gradation value of the output image generated through the range conversion process with the reference range and the setting range which are determined based on the display maximum luminance (1000 cd/m$^2$) obtained by execution of the calibration process on the display unit 3 before the luminance decreases. The dashed line 81 can also be said to indicate the gradation value of the output image generated through the range conversion process based only on the setting range.

By contrast, a straight line 82 in FIG. 8 indicates the gradation value of an output image B relative to the reflectance of the input image in a case where the display range is 0 to 800%. More specifically, the straight line 82 indicates the gradation value of the output image generated through the range conversion process using the reference range and the setting range which are determined based on the display maximum luminance (800 cd/m$^2$) obtained by execution of the calibration process on the display unit 3 when the luminance decreases.

In other words, execution of the processing according to the present example embodiment changes the output image to be generated from the output image A to the output image B, before and after the luminance of the display unit 3 decreases. By contrast, in a case where the display range is not changed using the display maximum luminance, the output image A is output, regardless of a decrease in the luminance of the display unit 3.

Figure 9:
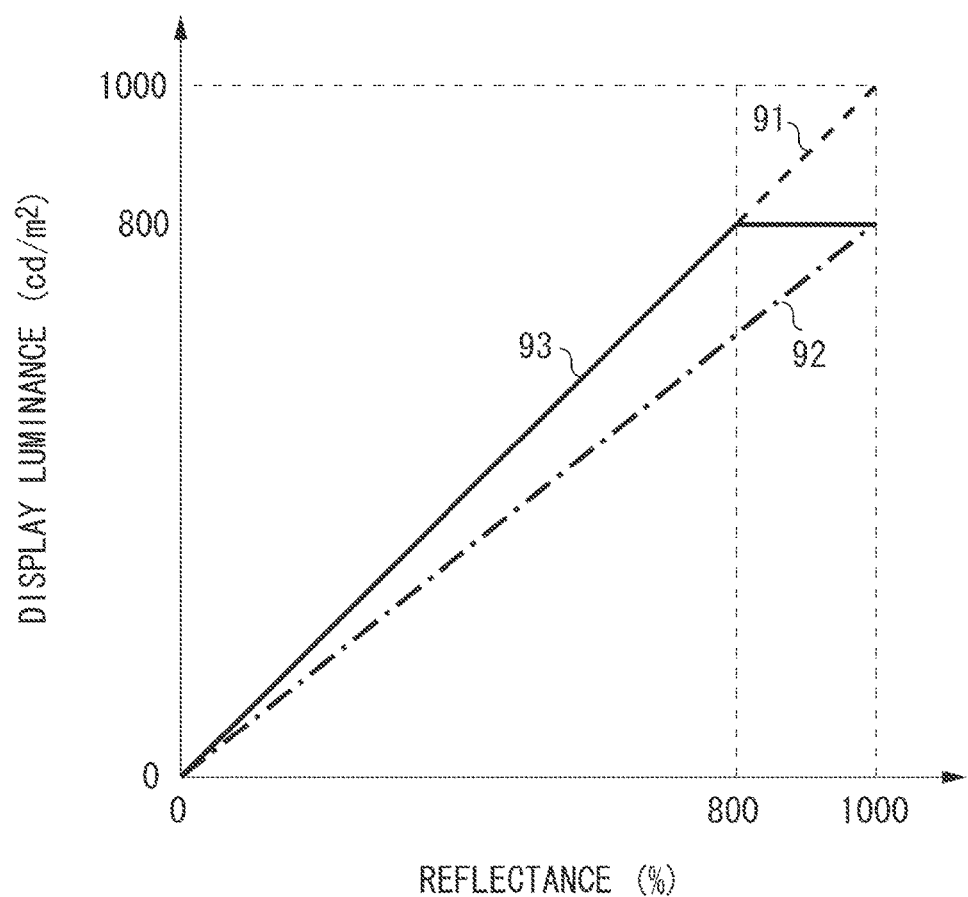
FIG. 9 is a schematic diagram illustrating a relationship between the reflectance of the input image and the display luminance in a case where an image is displayed on the display unit based on the output image.

FIG. 9 is a schematic diagram illustrating the relationship between the luminance-related value (the reflectance) of the input image and the display luminance in a case where an image is displayed on the display unit 3 based on the output image A and the output image B. A horizontal axis in FIG. 9 indicates the luminance-related value (the reflectance) of the input image. A vertical axis in FIG. 9 indicates the display luminance of the output image.

A dashed line 91 in FIG. 9 indicates the display luminance in a case where the display unit 3 displays an image based on the output image A before the luminance decreases. The output image A is an image having linear gradation characteristics in which the maximum value (1023) of the gradation value of the output image corresponds to the maximum value (1000%) of the luminance-related value of the input image. Since the display luminance of the display unit 3 has linear display characteristics relative to the gradation value, the maximum value of the gradation value of the output image A corresponds to the maximum display luminance at which the display unit 3 can perform display (1000 cd/m$^2$), and the gradation value linearly corresponds to the display luminance. Thus, an image is displayed on the display unit 3 at luminance faithful to the relationship between the luminance-related value of the input image and the luminance.

A dotted-dashed line 92 in FIG. 9 indicates the display luminance in a case where the display unit 3 displays an image based on the output image A when the luminance decreases. In a case where the display luminance decreases, the gradation value of the output image A linearly corresponds to the range up to the maximum display luminance (800 cd/m$^2$) at which the display unit 3 can perform display. In other words, the output image is displayed on the display unit 3 at luminance overall lower than luminance corresponding to the luminance-related value of the input image.

A solid line 93 in FIG. 9 indicates the display luminance in a case where the display unit 3 displays an image based on the output image B when the luminance decreases. The output image B is an image subjected to the range conversion process so as to correspond to the display range (0 to 800%) based on the maximum display luminance (800 cd/m$^2$) at which the display unit 3 can perform display when the luminance decreases. The maximum value of the gradation value of the output image B corresponds to the maximum value (800%) of the display range, and the gradation value linearly corresponds to the display luminance. Thus, in the input range, at a luminance-related value of the input image included in the display range, an image is displayed on the display unit 3 at luminance faithful to the relationship between the luminance-related value of the input image and the luminance.

As discussed in the publication of Japanese Patent Application Laid-Open No. 2004-220438, in a case where an image is displayed on a display apparatus based on a display image generated through a conventional technique, an area where a maximum gradation value is specified in the display image is displayed at the maximum value of the display luminance of the display apparatus.

However, for example, in a case where the display apparatus is a liquid crystal display, the maximum display luminance at which the display apparatus can perform display may decrease due to the degradation over time of the light source of a backlight. In a case where the maximum display luminance at which the display apparatus can perform display falls below the maximum value of a display range specified by a user, an image may not be able to be displayed at display luminance intended by the user.

By executing the aforementioned processing, the image processing apparatus according to the present example embodiment can generate the output image corresponding to the display range determined based on the maximum value of the display luminance (the display maximum luminance) of the display unit 3 measured by the measurement apparatus 2 through calibration. Thus, even in a case where the luminance at which the display unit 3 can perform display decreases due to degradation over time or the degradation of the light source, it is possible to faithfully represent the gradation characteristics of the range of the luminance at which display can be performed. Thus, in a case where the maximum display luminance at which the display unit 3 can perform display changes, it is possible to suppress a change in the display luminance of an area, in the input image, corresponding to the display range specified by the user.

The image processing unit 101 may generate, as on-screen display (OSD), a graphic image indicating the display range determined by the display range determination unit 105 and output the graphic image to the display unit 3 with the graphic image being combined with the output image.

Figure 10:
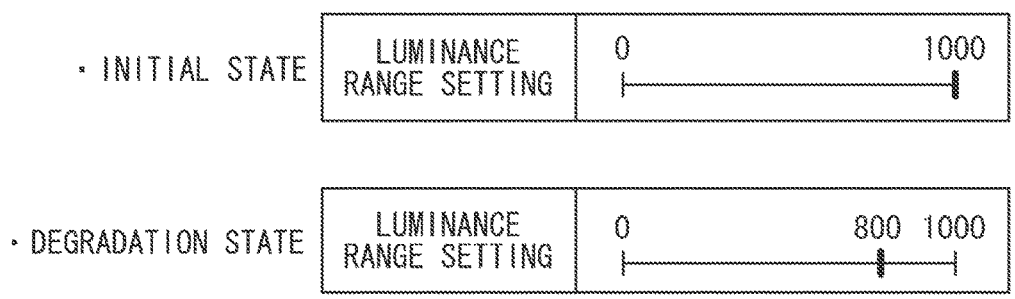
FIG. 10 is a schematic diagram illustrating an on-screen display (OSD) image indicating a display range generated by an image processing unit.

FIG. 10 is a schematic diagram illustrating an OSD image indicating the display range generated by the image processing unit 101. For example, the OSD image is a graphic image for displaying the setting range specified by the user and the display range of the output image in a combined manner. These images enable a user to easily recognize in a set dynamic range (the setting range) a dynamic range (the display range) where display is actually performed faithfully to the gradation characteristics of the input image. In FIG. 10, a luminance range setting indicates a screen on which the setting range and the display range are displayed. Before the luminance of the display unit 3 decreases (in an initial state), the display range (1000%) is equal to the setting range (1000%). In a case where the luminance of the display unit 3 decreases (in a degradation state), the display range (800%) is lower than the setting range (1000%), and the OSD image indicates that the display range decreases.

The image processing apparatus 1 can also execute calibration at any timing, and based on the acquired display maximum luminance, dynamically determine the display range moment by moment. This configuration can reduce influence on an image due to a fluctuation in the display luminance based on the temperature of the display unit 3 or the use environment. For example, the measurement apparatus 2 may be built into the display unit 3. The measurement apparatus 2 is placed at the position where the measurement apparatus 2 does not prevent the user from visually checking an image, such as an end portion of the screen of the display unit 3, and it is possible to execute calibration at any timing and acquire the display maximum luminance.

A method for acquiring the display maximum luminance indicating the maximum value of the luminance at which the display unit 3 can perform display is not limited to the above method. For example, in a case where the display unit 3 is a liquid crystal display including a backlight for emitting light, and a liquid crystal panel, the display unit 3 may include a photosensor provided within the backlight and capable of measuring light emitted from the light source of the backlight. In this case, the display maximum luminance of the display unit 3 changes according to the light emission efficiency of the light source of the backlight. More specifically, the light emission efficiency of the light source of the backlight may be degraded due to heat generation or breakage, reducing the display maximum luminance. At this time, a change in the display maximum luminance roughly corresponds to a change in the light emission efficiency of the light source of the backlight. The measured luminance acquisition unit 104 may acquire the display maximum luminance based on a change in the light emission efficiency of the light source of the backlight acquired from the photosensor, and the initial display maximum luminance.

In a case where the display unit 3 is an organic EL display including a plurality of organic EL elements arranged in a matrix, the driving voltage or the driving current of a driver for applying a voltage to each organic EL element is monitored, and it is possible to acquire the display maximum luminance of the display unit 3. On the basis of the relationship between the driving voltage and the driving current of the organic EL display, the measured luminance acquisition unit 104 acquires the display maximum luminance. For example, the measured luminance acquisition unit 104 can acquire a driving current in a predetermined driving condition, reference a table, stored in advance in the storage unit 200, illustrating the relationship between the driving current and the display maximum luminance of the organic EL display, to acquire the display maximum luminance.

In the present example embodiment, a method for acquiring the display maximum luminance is not limited to a method for directly measuring the luminance of light emitted from the display unit 3 when calibration is performed. Furthermore, the display unit 3 is not limited to a liquid crystal display.

A second example embodiment of the present invention will be described below. An image processing apparatus 1 according to the present example embodiment generates an output image so that in a case where the reflectance of an input image is included in a particular range, the output image is displayed such that the display luminance has a linear relationship with the reflectance, and in a range other than the particular range, the output image is displayed in a compressed manner based on a predetermined exponential function. The image processing apparatus 1 determines as the particular range a setting range set by the user.

An apparatus configuration diagram and a functional block diagram of the image processing apparatus 1 according to the second example embodiment are similar to those in the first example embodiment. In the image processing apparatus 1 according to the second example embodiment, the functional blocks other than the display range determination unit 105 and the range conversion unit 109 are similar to those in the first example embodiment, and therefore are not described here.

The display range determination unit 105 acquires, from the setting range acquisition unit 103, information indicating a setting range where the display luminance is linear relative to the reflectance of the input image. Furthermore, the display range determination unit 105 acquires, from the measured luminance acquisition unit 104, display maximum luminance, which is the maximum display luminance at which the display unit 3 can perform display and which is obtained by calibration. For example, the setting range is 0 to 500%.

The range conversion unit 109 generates an output image from a linear image so that the display luminance is linear relative to reflectance included in the setting range. Further, the range conversion unit 109 generates the output image from the linear image so that the output image is displayed such that reflectance not included in the setting range corresponds to the range of the display luminance from display luminance corresponding to the upper limit value of the setting range to the display maximum luminance. In other words, the range conversion unit 109 generates the output image so that in the output image, an area corresponding to a luminance-related value included in the setting range is closer to the gradation characteristics of the input image than an area other than the area corresponding to the luminance-related value. For example, the dynamic range of the input image (the input range) is 0 to 1000%, and the maximum value of the luminance (the display maximum luminance) at which the display unit 3 can perform display is 800 cd/m$^2$.

Figure 11:
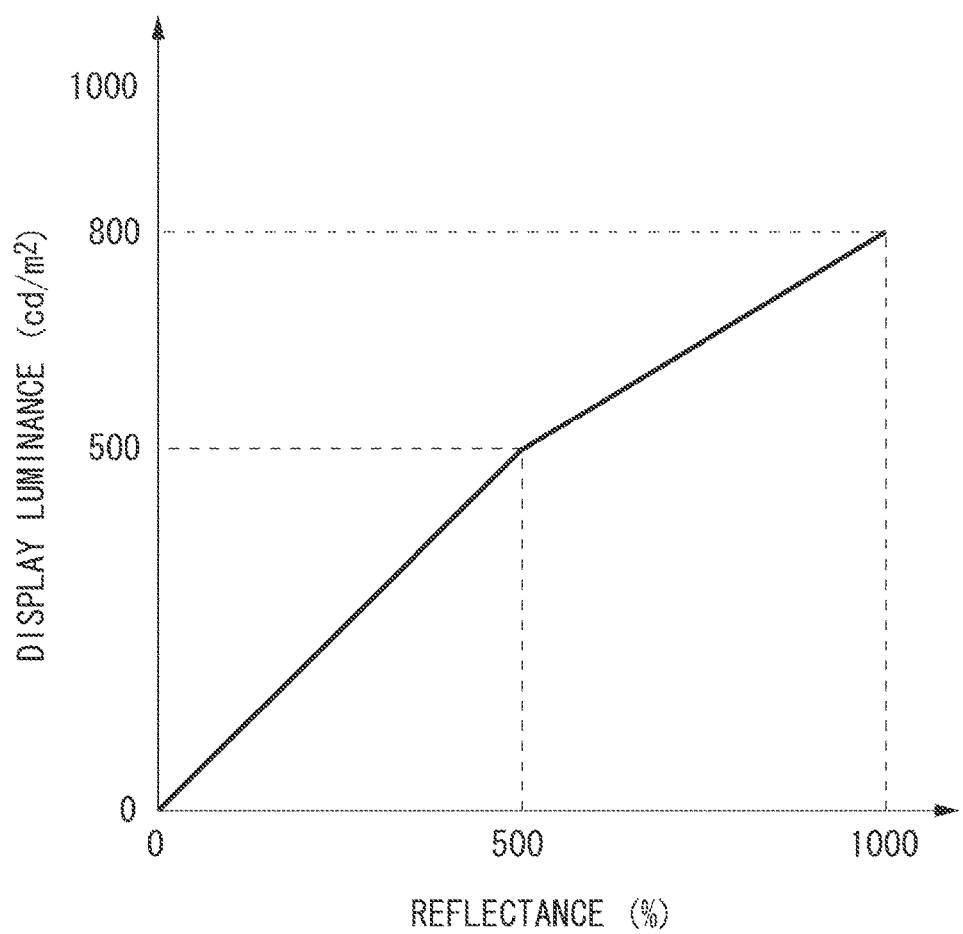
FIG. 11 is a schematic diagram illustrating a relationship between reflectance of an input image and display luminance, according to a second example embodiment.

FIG. 11 is a schematic diagram illustrating the luminance of the display unit 3 relative to the reflectance of the input image in a case where the display unit 3 displays an image based on the output image generated by the image processing apparatus 1 according to the second example embodiment. As illustrated in FIG. 11, in a case where the reflectance of the input image is included in the setting range (0 to 500%), the output image is generated so that the luminance has a linear relationship with the reflectance. Furthermore, at a reflectance exceeding the setting range (>500%), the gradation is compressed so that an image is displayed in the range from a display luminance of 500 cd/m$^2$ corresponding to the upper limit value of the setting range (500%) to the display maximum luminance (800 cd/m$^2$).

According to the second example embodiment, in a case where a maximum value of the luminance at which the display unit 3 can perform display decreases due to, for example, the degradation over time of the light source, it is possible to suppress a change in the display characteristics of the input image corresponding to at least reflectance included in the setting range. Furthermore, as described in the first example embodiment, for example, in a case where the maximum value of the display luminance of the display unit 3 decreases, it is possible to suppress a change in the display characteristics of the input image corresponding to at least reflectance included in the setting range. Thus, in a case where the maximum display luminance at which the display unit 3 can perform display changes, it is possible to suppress a change in the display luminance of an area, in the input image, corresponding to the setting range specified by the user.

Figure 12:
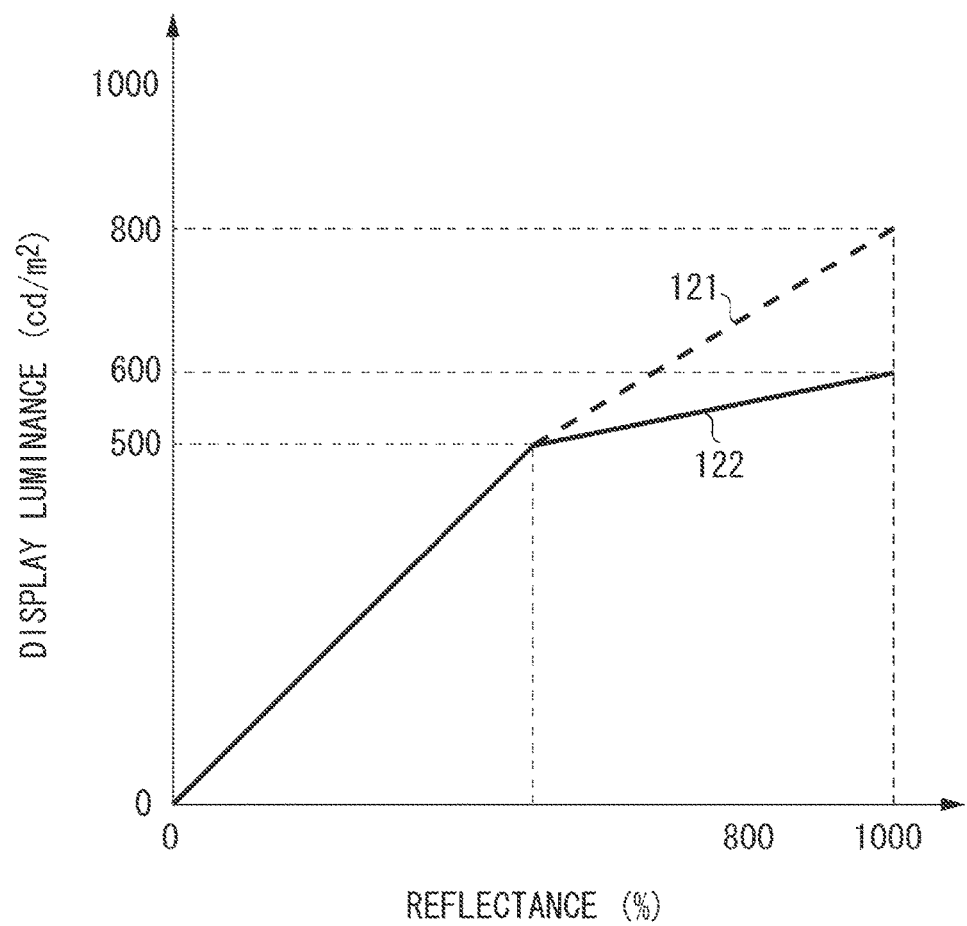
FIG. 12 is a schematic diagram illustrating a change in the display luminance relative to the reflectance of the input image before and after luminance of a display unit decreases, according to the second example embodiment.

FIG. 12 is a schematic diagram illustrating a change in the display luminance relative to the luminance-related value of the input image before and after the luminance decreases. A horizontal axis in FIG. 12 indicates the luminance-related value (the reflectance) of the input image. A vertical axis in FIG. 12 indicates the display luminance.

A dashed line 121 in FIG. 12 indicates the display luminance of an output image C generated based on the display maximum luminance obtained by execution of calibration on the display unit 3 before the luminance decreases. A solid line 122 in FIG. 12 indicates the display luminance of an output image C generated based on the display maximum luminance obtained by execution of calibration on the display unit 3 when the luminance decreases. The display luminance of the display unit 3 allows display up to 800 cd/m$^2$ before the luminance decreases. The display luminance of the display unit 3 allows display up to 600 cd/m$^2$ when the luminance decreases. The setting range is 0 to 500%.

In a case where the maximum value of the display luminance of the display unit 3 decreases from 800 cd/m$^2$ to 600 cd/m$^2$, the relationship between the reflectance of the input image and the luminance of an image to be displayed based on the output image to be output from the image processing apparatus 1 changes from the dashed line 121 to the solid line 122. Thus, even in a case where the display luminance at which the display unit 3 can perform display decreases, in the setting range (0 to 500%), an image is displayed faithfully to the relationship between the luminance-related value of the input image and the luminance, with characteristics in which the luminance is linear relative to the luminance-related value.

With these configurations, even in a case where the luminance at which the display unit 3 can perform display decreases, it is possible to suppress a decrease in the display luminance of a setting range where the user wishes to perform display at luminance faithful to a luminance-related value associated with the input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-148940, filed Jul. 28, 2016, which is hereby incorporated by reference herein in its entirety.

What is claimed is:

1. An image processing apparatus for outputting to a display unit an output image, the image processing apparatus comprising:
   at least one processor and/or at least one circuit to perform the operations of the following units:
   a first acquisition unit acquiring a detected value from a measurement unit for measuring luminance of an image displayed on the display unit;
   a setting unit setting the output dynamic range based on the detected value;
   a conversion unit generating the output image by converting gradation values of the input image based on the output dynamic range, and
   an output unit outputting the output image to the display unit, wherein
      the conversion unit converts a gradation value of a first pixel of an input image, the gradation value of the first pixel corresponding to luminance without the output dynamic range, into a predetermined gradation value, and converts a gradation value of a second pixel of the input image, the gradation value of the second pixel corresponding to luminance in the output dynamic range into a gradation value less than or equal to the predetermined gradation value.

2. The image processing apparatus according to claim 1, wherein the predetermined gradation value is a maximum value of a gradation value that can be taken by the output image.

3. The image processing apparatus according to claim 1, wherein
   the output unit outputs a calibration image to the display unit, and
   the first acquisition unit acquire the detected value corresponding to luminance of an image displayed on the display unit based on the calibration image.

4. The image processing apparatus according to claim 3, wherein the calibration image is an image including an all-white image at least at a position where the measurement unit can measure luminance.

5. The image processing apparatus according to claim 1, the following units further comprising:
   a second acquisition unit configured to acquire information indicating an input dynamic range which is a range of a value related to luminance that can be taken by the input image.

6. The image processing apparatus according to claim 5, wherein based on information indicating a relationship between display luminance of the display unit and the value related to luminance, the setting unit sets the output dynamic range so that a maximum value of luminance corresponding to the output dynamic range is the maximum value of the luminance at which the display unit can perform display.

7. The image processing apparatus according to claim 5, wherein the value related to luminance is a value indicating reflectance when light is reflected from an object.

8. The image processing apparatus according to claim 5, wherein the value related to luminance is an absolute value indicating luminance.

9. The image processing apparatus according to claim 5, wherein the output unit outputs a graphic image with the graphic image being combined with the output image, the graphic image indicating at least one of a value related to maximum luminance that can be taken by the output dynamic range and the maximum value of the luminance at which the display unit can perform display.

10. A display apparatus comprising:
    the image processing apparatus according to claim 1; and
    the display unit.

11. A method of controlling an image processing apparatus to cause an image processing apparatus to perform processing comprising:
    acquiring a detected value from a measurement unit for measuring luminance of an image displayed on a display unit;
    setting the output dynamic range based on the detected value;
    generating an output image by converting gradation values of an input image based on the output dynamic range, and
    an output unit outputting the output image to the display unit, wherein
      the generating converts a gradation value of a first pixel of an input image, the graduation value of the first pixel corresponding to luminance without the output dynamic range, into a predetermined gradation value, and converts a gradation value of a second pixel of the input image, the graduation value the second pixel corresponding to luminance in the output dynamic range into a gradation value less than or equal to the predetermined gradation value.

12. The method for controlling the image processing apparatus according to claim 11, wherein the predetermined gradation value is a maximum value of a gradation value that can be taken by the output image.

13. The method for controlling the image processing apparatus according to claim 11, wherein
outputting a calibration image to the display unit, and
acquiring the detected value corresponding to luminance of an image displayed on the display unit based on the calibration image.

14. The method for controlling the image processing apparatus according to claim 11, wherein the calibration image is an image including an all-white image at least at a position where the measurement unit can measure luminance.

15. The method for controlling the image processing apparatus according to claim 11, further comprising:
acquiring information indicating an input dynamic range which is a range of a value related to luminance that can be taken by the input image.

16. The method for controlling the image processing apparatus according to claim 15, wherein based on information indicating a relationship between display luminance of the display unit and the value related to luminance, the output dynamic range is set so that a maximum value of luminance corresponding to the output dynamic range is the maximum value of the luminance at which the display unit can perform display.

17. The method for controlling the image processing apparatus according to claim 15, wherein the value related to luminance is a value indicating reflectance when light is reflected from an object.

18. The method for controlling the image processing apparatus according to claim 15, wherein the value related to luminance is an absolute value indicating luminance.

19. The method for controlling the image processing apparatus according to claim 15, wherein a graphic image is output with the graphic image being combining with the output image, the graphic image indicating at least one of a value related to maximum luminance that can be taken by the output dynamic range and the maximum value of the luminance at which the display unit can perform display.

20. A non-transitory storage medium having stored therein a program that can be executed by a processor to cause an image processing apparatus connected with the processor to execute processing comprising:
acquiring a detected value from a measurement unit for measuring luminance of an image displayed on a display unit;
setting the output dynamic range based on the detected value;
generating an output image by converting gradation values of an input image based on the output dynamic range, and
an output unit outputting the output image to the display unit, wherein
the generating converts a gradation value of a first pixel of an input image, the graduation value of the first pixel corresponding to luminance without the output dynamic range, into a predetermined gradation value,
and converts a gradation value of a second pixel of the input image, the graduation value the second pixel corresponding to luminance in the output dynamic range into a gradation value less than or equal to the predetermined gradation value.

21. The image processing apparatus according to claim 1, wherein
a maximum value of the output dynamic range corresponds to a maximum value of luminance at which the display unit is able to perform display,
luminance of the first pixel is higher than the maximum value of luminance at which the display unit is able to perform display, and
luminance of the second pixel is not higher than the maximum value of luminance at which the display unit is able to perform display.

22. The method for controlling the image processing apparatus according to claim 11, wherein
a maximum value of the output dynamic range corresponds to a maximum value of luminance at which the display unit is able to perform display,
luminance of the first pixel is higher than the maximum value of luminance at which the display unit is able to perform display, and
luminance of the second pixel is not higher than the maximum value of luminance at which the display unit is able to perform display.

* * * * *